US009558290B2

(12) United States Patent
Bilodeau et al.

(10) Patent No.: US 9,558,290 B2
(45) Date of Patent: Jan. 31, 2017

(54) APPARATUS, METHOD, AND SYSTEM FOR PROVIDING HOVER INFORMATION

(71) Applicant: Verizon Patent and Licensing Inc., Arlington, VA (US)

(72) Inventors: David J. Bilodeau, Irving, TX (US); Logan Weaver, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 14/327,355

(22) Filed: Jul. 9, 2014

(65) Prior Publication Data

US 2016/0012143 A1    Jan. 14, 2016

(51) Int. Cl.
| | | |
|---|---|---|
| G06F 17/22 | (2006.01) |
| G06F 17/30 | (2006.01) |
| G06F 9/455 | (2006.01) |
| G06F 9/44 | (2006.01) |

(52) U.S. Cl.
CPC ....... *G06F 17/30893* (2013.01); *G06F 9/4443* (2013.01); *G06F 9/45512* (2013.01); *G06F 17/30929* (2013.01)

(58) Field of Classification Search
CPC ............................ G06F 3/04842; G06F 9/443; G06F 17/30893; G06F 17/30876; G06F 9/45512; G06F 17/30929; G06F 3/04817; G06F 3/048
See application file for complete search history.

(56) References Cited

U.S. PATENT DOCUMENTS

| | | | | |
|---|---|---|---|---|
| 7,404,149 B2* | 7/2008 | Fox | ..................... | G06F 3/04812 715/763 |
| 8,595,208 B2* | 11/2013 | Jing | .................. | G06F 17/30864 707/707 |
| 9,015,141 B2* | 4/2015 | Ravindran | ........ | G06F 17/30864 706/12 |
| 9,122,762 B2* | 9/2015 | Ragan | | |
| 9,146,752 B2* | 9/2015 | Santos-Gomez | ..... | G06F 9/4443 |
| 9,274,742 B2* | 3/2016 | Phillips | ................. | G06F 9/4445 |
| 2006/0104276 A1* | 5/2006 | Naick | ................... | G06F 17/245 370/392 |
| 2006/0184880 A1* | 8/2006 | Bala | ..................... | G06F 9/4446 715/705 |
| 2009/0024936 A1* | 1/2009 | Ragan | ................. | G06F 17/3089 715/760 |
| 2009/0132919 A1* | 5/2009 | Allen, Jr. | .............. | G06F 9/4446 715/708 |
| 2012/0203757 A1* | 8/2012 | Ravindran | .......... | G06F 17/3089 707/706 |
| 2013/0061177 A1* | 3/2013 | Santos-Gomez | ..... | G06F 9/4443 715/825 |

(Continued)

*Primary Examiner* — Maikhanh Nguyen

(57) ABSTRACT

A modification platform for dynamically modifying hover information associated with on-screen field of an application is disclosed. The modification platform stores the hover information in a row of a database. The row is associated with the on-screen field to which the hover information applies. The modification platform initiates a programmatic script to retrieve the hover information when the application is running. The programmatic script queries the database to retrieve the hover information. Further, a user interface is presented for editing and storing the hover information in the database.

10 Claims, 18 Drawing Sheets

(56) References Cited

U.S. PATENT DOCUMENTS

2013/0139042 A1* 5/2013 Padala .................. G06Q 10/10
715/205
2014/0304004 A1* 10/2014 Trethewey ............ G06F 1/1626
705/3

* cited by examiner

FIG.7F

| | COLUMN_NAME | DATA_TYPE |
|---|---|---|
| 1 | HOVERINFORMATION_LOCATION_CODE | VARCHAR2 (64 BYTE) |
| 2 | HOVERINFORMATION_LOCATION_TRANSLATION | VARCHAR2 (64 BYTE) |
| 3 | OPERATION_NAME | VARCHAR2 (64 BYTE) |
| 4 | HOVERINFORMATION_OPERATION_TRANSLATION | VARCHAR2 (64 BYTE) |
| 5 | HOVERINFORMATION_VALUE | VARCHAR2 (1024 BYTE) |
| 6 | HOVERINFORMATION_VERSION | VARCHAR2 (64 BYTE) |
| 7 | CWDOCID | VARCHAR2 (16 BYTE) |

| GENERAL | VARIABLES | METHODS | MAPPING |
|---|---|---|---|

| NAME | TYPE |
|---|---|
| HOVERINFORMATION_LOCATION_CODE | CWT_DICT.STRING64(STRING, 64) |
| OPERATION_NAME | CWT_DICT.STRING64(STRING, 64) |
| HOVERINFORMATION_VALUE | CWT_DICT.STRING1024(STRING, 1024) |
| HOVERINFORMATION_VERSION | CWT_DICT.STRING64(STRING, 64) |
| CWDOCID | CWF.CWDOCID(STRING, 16) |
| PIP_SERVICE_PORT_TYPEV0 | CWT_DICT.STRING1024(STRING, 1024) |
| PIP_SERVICE_PORT_TYPEV1 | CWT_DICT.STRING1024(STRING, 1024) |
| PIP_SERVICE_PORT_SPEED | CWT_DICT.STRING1024(STRING, 1024) |
| PIP_SERVICE_DYNAMIC_BANDWIDTH | CWT_DICT.STRING1024(STRING, 1024) |
| NUMBEROFVPNS | CWT_DICT.STRING1024(STRING, 1024) |
| ISWANREPORTING | CWT_DICT.STRING1024(STRING, 1024) |
| TSPLABEL | CWT_DICT.STRING1024(STRING, 1024) |

```
1  FUNCTION SETHOVERINFORMATIONDATA() {
2   VAR PIPHOVERINFORMATIONFINDERRESULT = FINDER.RUNFINDER("SUPPORT.TOOLS.IAD.PIPHOVERINFORMATIONFINDER", "SELECT", THIS);
3   FOR(VAR I = 0; I < PIPHOVERINFORMATIONFINDERRESULT.LENGTH; I++) {
4    IF(PIPHOVERINFORMATIONFINDERRESULT[I].HOVERINFORMATION_LOCATION_CODE == "PR_PIP_SVC") {
5     IF(PIPHOVERINFORMATIONFINDERRESULT[I].OPERATION_NAME == "PIP_SERVICE_PORT_TYPE") {
6      IF(PIPHOVERINFORMATIONFINDERRESULT[I].HOVERINFORMATION_VERSION == "0") {
7       THIS.PIP_SERVICE_PORT_TYPEV0 = PIPHOVERINFORMATIONFINDERRESULT[I].HOVERINFORMATION_VALUE;
8      }ELSE{
9       THIS.PIP_SERVICE_PORT_TYPEV1 = PIPHOVERINFORMATIONFINDERRESULT[I].HOVERINFORMATION_VALUE;
10     }
11    }
12    ELSE IF(PIPHOVERINFORMATIONFINDERRESULT[I].OPERATION_NAME == "PIP_SERVICE_PORT_SPEED") {
13     THIS.PIP_SERVICE_PORT_SPEED = PIPHOVERINFORMATIONFINDERRESULT[I].HOVERINFORMATION_VALUE;
14    }
15    ELSE IF(PIPHOVERINFORMATIONFINDERRESULT[I].OPERATION_NAME == "PIP_SERVICE_DYNAMIC_BANDWIDTH") {
16     THIS.PIP_SERVICE_DYNAMIC_BANDWIDTH = PIPHOVERINFORMATIONFINDERRESULT[I].HOVERINFORMATION_VALUE
17    }
```

FIG. 11

```
1   FUNCTION PIPHOVERINFORMATIONRETURNVALUES(ELEMENTNAME) {
2     VAR HOVERINFORMATIONVALUE;
      SWITCH (ELEMENTNAME) {
3         CASE "PIP_SERVICE_PORT_TYPEV0" : HOVERINFORMATIONVALUE = THIS.PIP_SERVICE_PORT_TYPEV0;
4         BREAK;
5         CASE "PIP_SERVICE_PORT_TYPEV1" : HOVERINFORMATIONVALUE = THIS.PIP_SERVICE_PORT_TYPE1;
6         BREAK;
7         CASE "PIP_SERVICE_PORT_SPEED" : HOVERINFORMATIONVALUE = THIS.PIP_SERVICE_PORT_SPEED;
8         BREAK;
39        CASE "SCI_CSPCUSTSERVICEID" : HOVERINFORMATIONVALUE = THIS.SCI_CSPCUSTSERVICEID;
40        BREAK;
41        CASE "VPNLIST" : HOVERINFORMATIONVALUE = THIS.VPNLIST;
42        BREAK;
43    }
44
45    RETURN HOVERINFORMATIONVALUE;
```

1101

APPARATUS, METHOD, AND SYSTEM FOR PROVIDING HOVER INFORMATION

BACKGROUND INFORMATION

In Graphical User Interfaces (GUIs), a field-level help or a short description may pop up when cursor of a pointing device is hovered or placed over a graphical element (e.g., an icon, a text, a hyperlink, etc.). Examples of pointing device include a computer mouse, a track ball, a touch screen, and the like. Generally, hover texts are hard coded for GUI of software applications. Therefore, for a GUI with various graphical elements, a lot of effort is required to provide the hover text.

Moreover, the software code has to be modified and the application re-compiled every time a change is required in the hover text. Hover texts are generally displayed in a yellow box with text with no hyperlinks or formatting such as, font, font size, placement, etc. Modification of formatting is typically possible only through rewriting or updating of the software code.

Based on the foregoing, techniques are desired for creating and modifying hover text for applications.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7F is a diagram of architecture of a database for storing the hover information, according to one embodiment;

FIG. 8 is a diagram of a Graphical User Interface (GUI) of an application for enabling the hover information on a page, according to one embodiment;

FIG. 10 is a diagram of a pseudo code for setting initial values of the hover information, according to one embodiment;

FIG. 11 is a diagram of a pseudo code for retrieving hover information return values, according to one embodiment;

DESCRIPTION OF THE PREFERRED EMBODIMENT

An apparatus, method, and system for creating and modifying hover information for applications, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
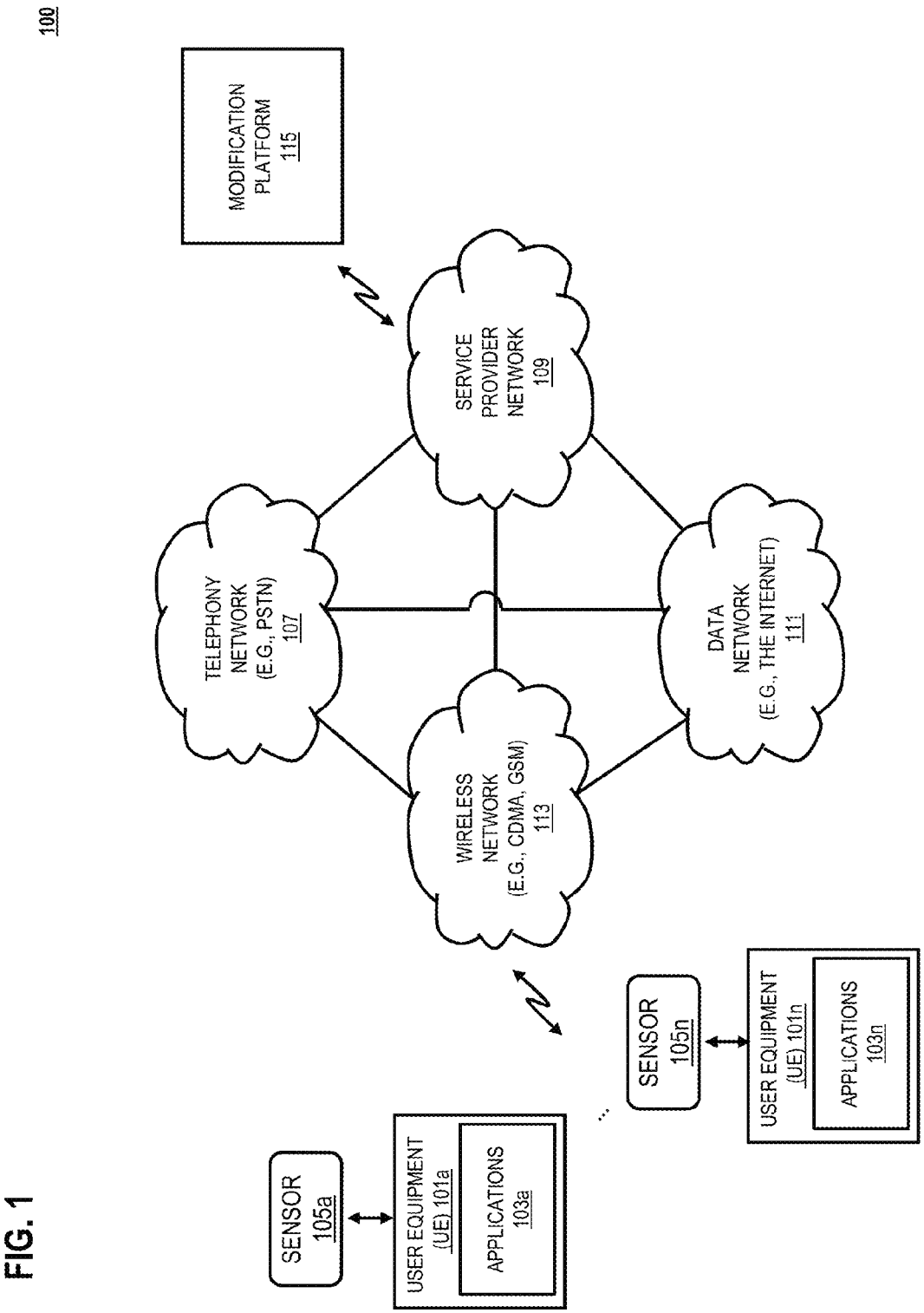
FIG. 1 is a diagram of a system capable of creating hover information, according to one embodiment.

FIG. 1 is a diagram of a system capable of creating hover information for applications. In one embodiment, the system may also be capable for modifying the hover information of graphical elements (e.g., an icon, a text, etc.). In one scenario, the hover information may include, but is not restricted to, a hover text and/or content, a font of the hover text, a font size of the hover text, a position and/or a placement of a hover text window, a location of the hover text data, a data type of the hover text data, and the like. The terms "hover information" and "hover text data" are used interchangeably herein, to indicate information displayed over graphical elements based on a user interface interaction event associated with on-screen fields of a page such as, a web page. In one embodiment, the graphical elements may include multi-choice screen elements. The user interface interaction event may include, but is not restricted to, a mouse over, a mouse click, a mouse leave, and the like over multi-choice screen elements with a pointing device. Examples of pointing device may include, but is not restricted to, a computer mouse, a track ball, touch screen, and the like. In one implementation, the multi-choice screen elements are the elements for which hover text data is already created and may be stored in a database. The multi-choice screen element may include, but is not restricted to, a hyperlink, a radio button, a drop-down list, a list box, a combination box, a check box, a cycle button, a datagrid, a slider, and a combination thereof.

For the purpose of illustration, a system 100 employs, in certain embodiments, user equipment 101a-101n, hereinafter referred to as a user equipment 101. In one embodiment, the user equipment 101 may include, but is not restricted to, a computer, a laptop, a Personal Digital Assistance (PDA), a tablet, a smart phone, a palmtop, and the like. The user equipment 101 may further include applications 103a-103n, hereinafter referred to as an application 103. In one embodiment, the application 103 may be a Graphical User Interface (GUI) of the user equipment 101 that provides options to application developers to create and modify hover text data of multi-choice screen elements of on-screen fields. In another embodiment, the application 103 may enable the application developers to format style of the hover text data, for example, font size, font, and the like.

In yet another embodiment, the application 103 may enable the application developers to format placement and/ or positioning of the hover text window over the graphical and/or multi-choice screen elements. For example, the hover text window may be placed below the multi-choice screen element, above the multi-choice screen element, left hand side of the multi-choice screen element, right hand side of the multi-choice screen elements, center of the multi-choice screen elements and the like. Further, the application 103 provides a user-friendly GUI to locate and/or update the hover text data for a specific multi-choice screen element and therefore, requires no coding beyond a first phase (i.e., when the application 103 is being built). Further, the application 103 enables only authorized user of the application to modify the hover text data.

Further, the user equipment 101 may use sensors 105*a*-105*n*, hereinafter referred to as a sensor 105, to communicate with a modification platform 115 through various networks including a telephony network 107, a service provider data network 109, a data network 111, a wireless network 113, and the like. For illustrative purposes, the networks 107-113 may be any suitable wireless networks, and are managed by service providers. For example, the telephony network 107 may include, but is not restricted to, a circuit-switched network, such as the Public Switched Telephone Network (PSTN), an Integrated Services Digital Network (ISDN), a Private Branch Exchange (PBX), or other like networks.

Although depicted as separate entities, the networks 107-113 may be completely or partially contained within one another, or may embody of the aforementioned infrastructures. For instance, a service provider network 109 may embody circuit-switched and/or packet-switched networks that may include facilities to provide for transport of circuit-switched and/or packet-based communications. It is further contemplated that the networks 107-113 may include components and facilities to provide signaling and/or bearer communications between the various components or facilities of the system 100. In this manner, the networks 107-113 may embody or include portions of a signaling system 7 (SS7) network, or other suitable infrastructure to support control and signaling functions. In addition, the system 100 may operate as separate parts that rendezvous and synchronize periodically to form a larger system with similar characteristics.

Further, data network 111 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, wireless network 113 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like.

Further, the modification platform 115 may modify the hover text data of the multi-choice screen elements of the on-screen fields, according to one embodiment. For example, in a web page, a multi-choice screen element such as, a drop-down list displays the hover text data as "select device", the modification platform 115 may enable an application developer to edit the hover text data to "select a mobile device". In another embodiment, the modification platform 115 may enable the application developers to add and/or remove the hover text data displayed in the hover text window. Also, the modification platform 115 may provide options to the application developers to format style of the hover text data, for example, a font size, a font, bold the hover text, italicize the hover text, and the like.

Further, the modification platform 115 may store the hover text data associated with the multi-choice screen elements in a database. In an embodiment, the hover text data is stored in rows of the database, which is associated with on-screen fields to which the hover text data applies. In one implementation, the application 103 communicates with the modification platform 115 to modify the hover text data associated with the multi-choice screen elements. Further, the modification platform 115 may receive one or more queries from the application developers to retrieve the hover text data stored in the database. In another embodiment, the modification platform 115 may match the queries received from the application developers with the hover text data stored in the database. Further, the modification platform 115 may retrieve the hover text data based on the queries triggered by the application developers. The components of the modification platform 115 are described in conjunction with FIG. 2.

Figure 2:
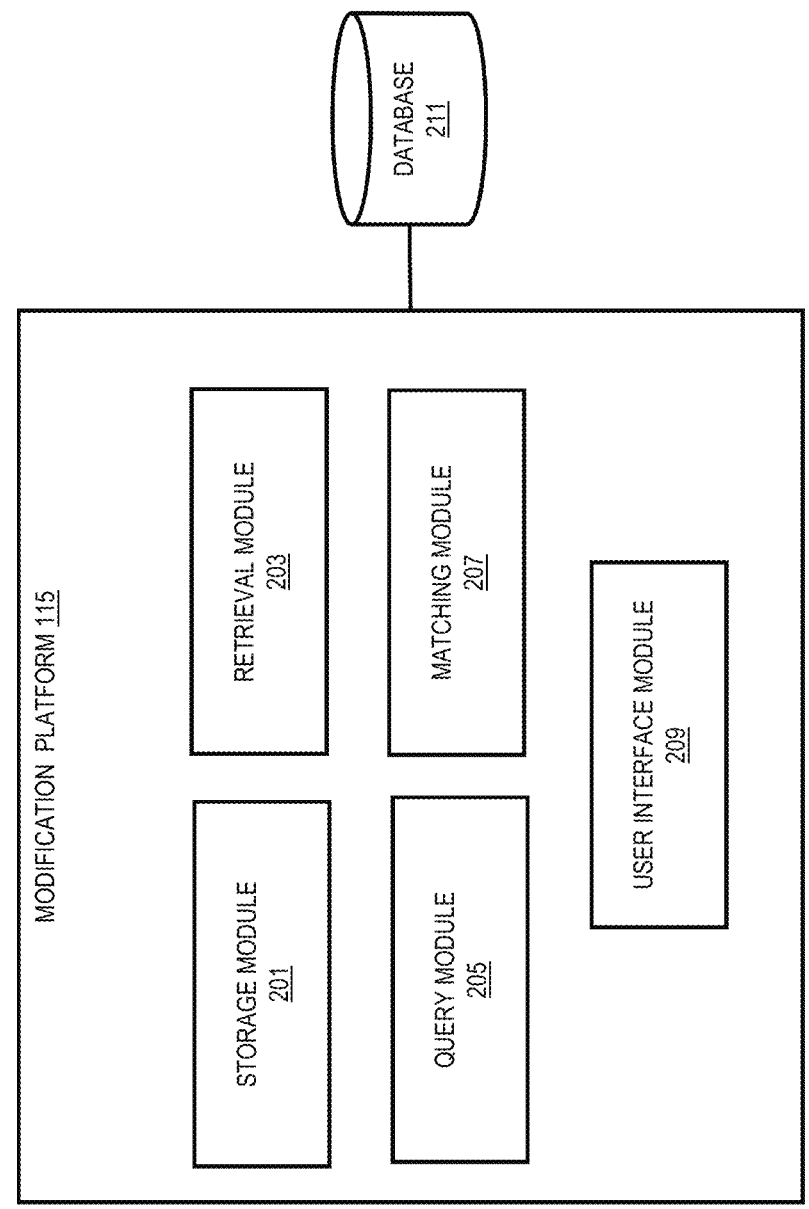
FIG. 2 is a diagram of components of a modification platform for modifying the hover information, according to one embodiment.

FIG. 2 is a diagram of components of the modification platform 115 for modifying hover text data, according to one embodiment. The modification platform 115 may include a storage module 201, a retrieval module 203, a query module 205, a matching module 207, and a user interface module 209. In an embodiment, the modification platform 115 is connected to a database 211.

The storage module 201 may store hover text data of an on-screen field in the database, according to an embodiment. The hover text data may include, but is not restricted to, a hover text and/or content, a font of the hover text, a font size of the hover text, a position and/or a placement of a hover text window, a location of the hover text data, a data type of the hover text data, and the like. The storage module 201 may sequentially store the hover text data for each on-screen field in rows of the database. In one embodiment, the database may be the database 211 that is connected to the modification platform 115. In another embodiment, the database 211 may be stored within the modification platform 115.

The storage module 201 may store the hover text data according to a schema, in an embodiment. The schema may include, but is not restricted to, a location code, a location code translation, an operation code, an operation code translation, a hover text value, a version code, a document code, and the like. The location code is a code that may be used to determine a location where the hover text data is located. For example, the hover text data location code may refer to a page where the coding of the hover text data may be found. Next, a location translation code is an English translation of the hover text data location code.

Further, an operation code is a code that may be used to determine a field on a page where the hover text data is to be displayed. In one scenario, this may refer to an actual name of the on-screen field in a Graphical User Interface (GUI) as well as a variable name in a reference document. An operation code translation is an English translation of the operation code. Generally, it is equal to a label of the on-screen field. A hover text value may be referred to a hover text content and/or message that may be displayed in the GUI for multi-choice elements of the on-screen field. Further, a version code may be a numeric field that is used to specify a version of the on-screen field if there are multiple versions for its hover text data. For example, if an editor selects a port type as "Ethernet" then the version field may automatically displays version 0, or if the editor selects the port type as "TDM" then the version field may display version 1.

The retrieval module 203 may retrieve the hover text data from the database 211. In an embodiment, the hover text data may be retrieved from the database 211 by using a programmatic script. In an embodiment, the programmatic script may be a JavaScript, or a .NET framework to trigger a Structured Query Language (SQL) query over the database 211. The programmatic script may also be a third Generation Programming Language (3GL), for example, C, C++, C#, BASIC, PASCAL, etc.

The query module 205 may query the database 211 for the hover text data. In an embodiment, the query module 205 may query the database 211 for retrieving the hover text data associated with the on-screen field by using the programmatic script. For example, the query module 205 receives a query for retrieving the hover text data for an on-screen name field by providing inputs such as, an operation name, a version code, and the like.

Further, the query module 205 may initiate an execution of the programmatic script against a reference document. The reference document may specify a rendering of a page that may include the on-screen fields, in an embodiment. The reference document may store the hover text data values from the database 211 for each on-screen field needing a hover text data.

The matching module 207 may pre-populate the page with the hover text data queried from the database 211. In an embodiment, the matching module 207 may pre-populate the page with the hover text data based on the execution of the programmatic script. For example, when the application 103 is being loaded, the programmatic script automatically runs in the background of the user equipment 101 that consults a reference document and queries the database 211 to automatically fill-in on-screen fields on the page with query results. Further, the matching module 207 may match the hover text data stored in the database 211 with the on-screen fields for the rendering of the page. For example, the matching module 207 may match the hover text data with the on-screen field and then formats (e.g., translate) the coded fetched hover text data to display to it on the page. For example, the matching module 207 matches the hover text data with the on-screen field and then formats (e.g., translate) the coded fetched hover text data into English language to display it on the page.

The user interface module 209 may present the hover text data on the GUI based on a user interface interaction event associated with the on-screen fields. In one embodiment, the user interface interaction event may include, but is not restricted to, a mouse over, a mouse click, a mouse leave, and the like. The event may be created by using a pointing device, for example, a computer mouse, a track ball, touch screen, and the like over the on-screen fields. Further, the user interface module 209 may present a Graphical User Interface (GUI) for editing the hover text data stored in the database 211 for the on-screen fields. In an embodiment, an editor may edit the hover text data for the on-screen fields according to the schema (as discussed above). In an embodiment, the editor may be the application developer.

Further, the user interface module 209 may identify multi-choice screen elements associated with the on-screen fields. The multi-choice screen elements are the elements of the on-screen fields for which the hover text data is already created and stored in the database 211. The multi-choice screen element may include, but is not restricted to, a hyperlink, a radio button, a drop-down list, a list box, a combination box, a check box, a cycle button, a datagrid, a slider, and a combination thereof. Further, the user interface module 209 may present editing options for the hover text data with respect to the multi-choice screen elements.

Figure 3:
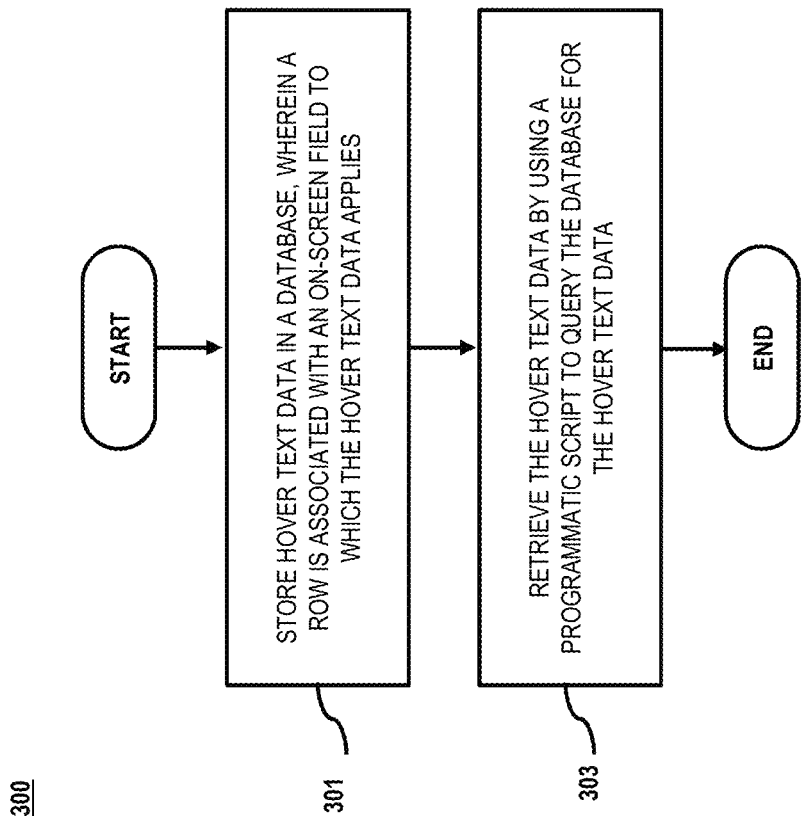
FIG. 3 is a flowchart of a process for storing and displaying the hover information, according to one embodiment.

FIG. 3 is a flowchart of a process for storing and displaying hover text data, according to an embodiment. At step 301, a modification platform 115 stores hover text data of an on-screen field in the database 211, according to an embodiment. The modification platform 115 stores the hover text data in a row of the database 211. Further, each row of the database 211 is associated with an on-screen field to which the hover text data applies. In one embodiment, the database 211 is connected to the modification platform 115. In another embodiment, the database 211 may be stored within the modification platform 115.

At step 303, the modification platform 115 retrieves the hover text data from the database 211. In an embodiment, the hover text data may be retrieved from the database 211 by using a programmatic script. In one embodiment, the programmatic script may be a JavaScript, or a .NET framework to trigger a Structured Query Language (SQL) query over the database 211. The programmatic script may also be a third Generation Programming Language (3GL), for example, C, C++, C#, BASIC, PASCAL, etc.

The programmatic script is used to run a query in the database 211, which stores a hover text value (hover text content) corresponding to the on-screen field and then retrieves the hover text data to display at the time of the user interface interaction event. In one embodiment, the user interface interaction event may include, but is not restricted to, a mouse over, a mouse click, a mouse leave, and the like. The event may be created by using a pointing device, for example, a computer mouse, a track ball, touch screen, and the like over the on-screen fields.

Figure 4:
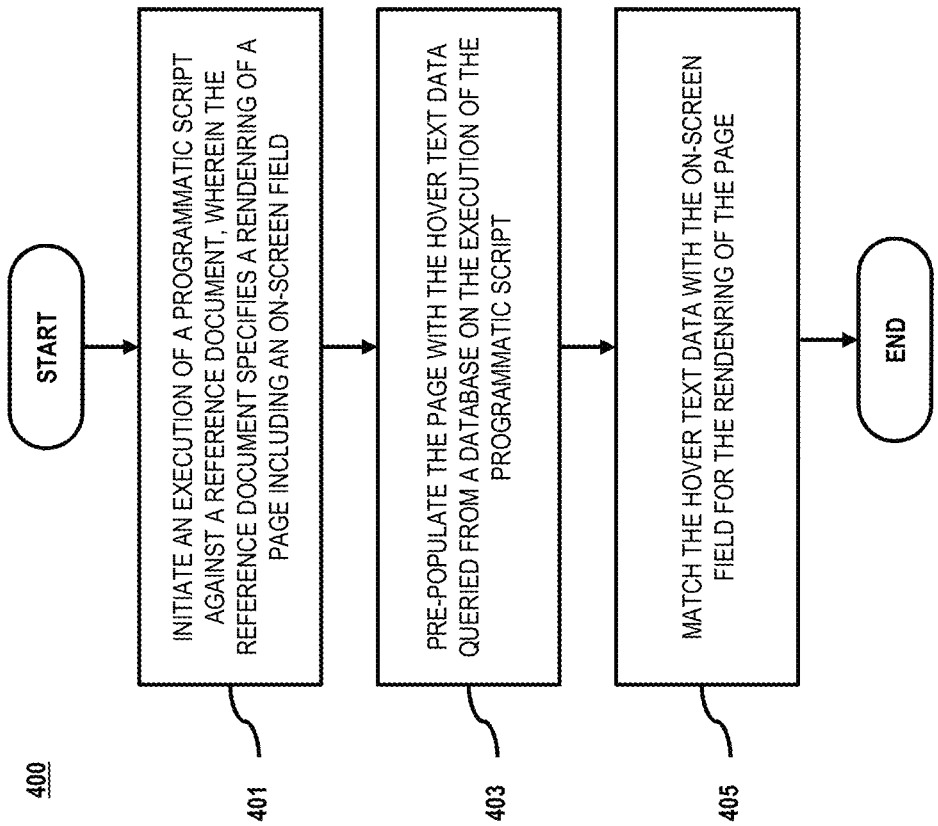
FIG. 4 is a flowchart of a process for displaying the hover information, according to another embodiment.

FIG. 4 is a flowchart of a process for displaying hover text data, according to another embodiment. At step 401, a modification platform 115 initiates an execution of a programmatic script against a reference document. In one embodiment, the programmatic script may be a JavaScript, or a .NET framework to trigger a Structured Query Language (SQL) query over the database 211. The programmatic script may also be a third Generation Programming Language (3GL), for example, C, C++, C#, BASIC, PASCAL, etc. In one embodiment, the reference document may specify a rendering of a page that may include on-screen fields. The reference document may store the hover text values from the database 211 for each on-screen field needing a hover text data.

At step 403, the modification platform 115 pre-populates the page with a hover text data queried from the database 211 on the execution of the programmatic script. The modification platform 115 fetches a coded hover text data from the database 211. For example, when the application 103 is being loaded, the programmatic script automatically runs in the background of the user equipment 101 that consults a reference document and queries the database 211 to automatically fill-in on-screen fields on the page with query results.

Next, at step 405, the modification platform 115 matches the hover text data with the on-screen fields for the rendering of the page. For example, the modification platform 115 match the hover text data with the on-screen field and then formats (e.g., translate) the coded fetched hover text data to display it on the page.

Figure 5:
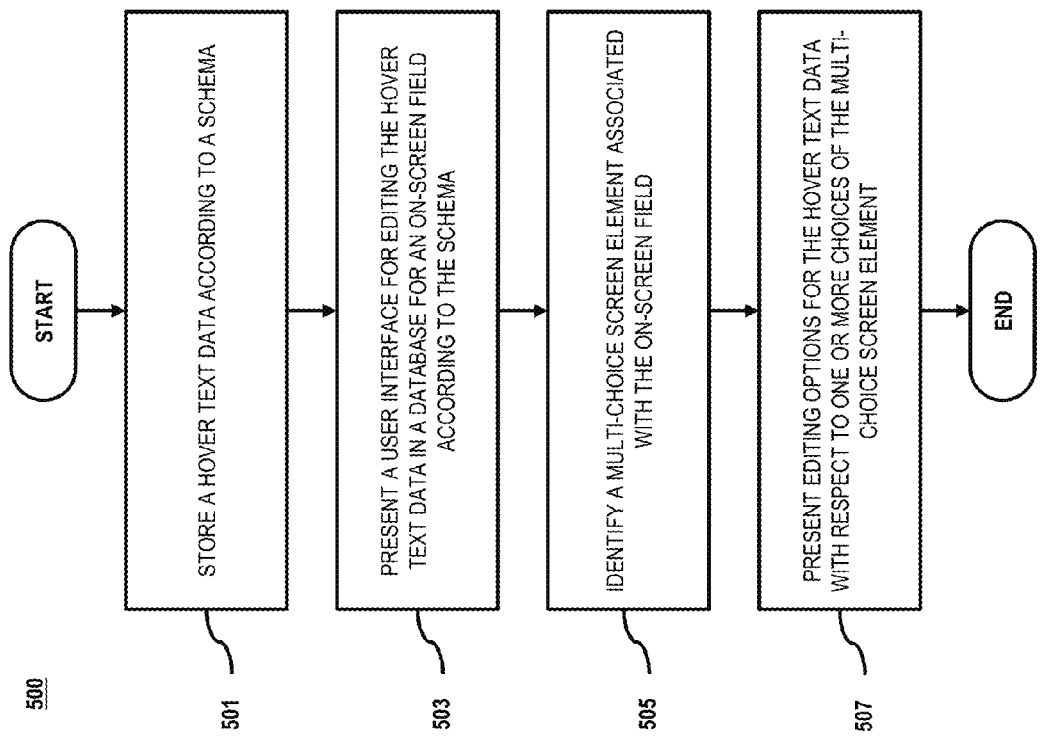
FIG. 5 is a flowchart of a process for presenting editing options to edit the hover information, according to one embodiment.

FIG. 5 is a flowchart of a process for presenting editing options to edit hover text data, according to an embodiment. At step 501, a modification platform 115 stores hover text data according to a schema. In one embodiment, the hover text data is stored in the database 211. The schema may include, but is not restricted to, a location code, a location code translation, an operation code, an operation code translation, a hover text value, a version code, a document code, and the like. The location code is a code that may be used to determine a location where the hover text data is located. For example, the hover text data location code may refer to a page where the coding of the hover text data may be found. Next, a location translation code is an English translation of the hover text data location code.

Further, an operation code is a code that may be used to determine a field on a page where the hover text data may be found. In one scenario, this may refer to an actual name of the on-screen field in a GUI as well as a variable name in a reference document. An operation code translation is an English translation of the operation code. Generally, it is equal to a label of the on-screen field. A hover text value may be referred to a hover text content and/or message that may be displayed in the GUI for multi-choice elements of the on-screen field. Further, a version code may be a numeric field that is used to specify a version of the on-screen field if there are multiple versions for its hover text data. For example, if an editor selects port type as "Ethernet" then the version may display version 0, or if the editor selects port type as "TDM" then the version may display version 1.

Further, at step 503, the modification platform 115 presents a user interface for editing the hover text data in the database 211 for an on-screen field according to the schema. An editor may edit the hover text data stored in the database 211 for the on-screen field. At step 505, the modification platform 115 identifies a multi-choice screen element that is associated with the on-screen field. In one implementation, the multi-choice screen element is an element for which a hover text data is already created and stored in the database 211. The multi-choice screen element may include, but is not restricted to, a hyperlink, a radio button, a drop-down list, a list box, a combination box, a check box, a cycle button, a datagrid, a slider, and a combination thereof.

Thereafter, at step 507, the modification platform 115 presents editing options for the hover text data with respect to choices of the multi-choice screen elements. For example, the modification platform 115 presents editing options to the editor to edit hover text data associated with one or more choices between radio buttons of an on-screen field. Therefore, the editor may edit the hover text data for one or more, for example, check boxes within an on-screen field.

Figure 6:
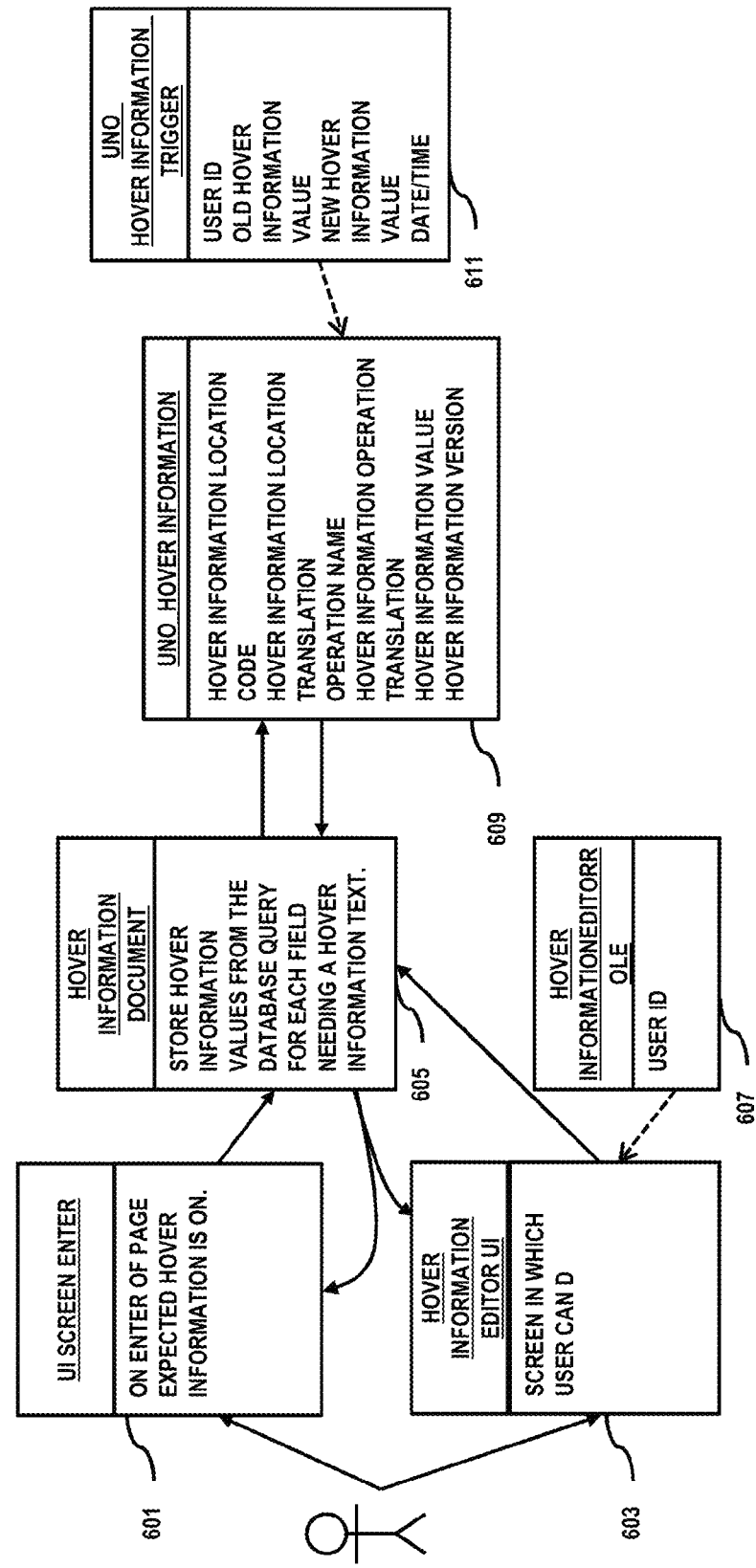
FIG. 6 is a high-level functional diagram for creating and modifying the hover information, according to one embodiment.

FIG. 6 is a high-level functional diagram for creating and modifying the hover information, according to an embodiment. When an application developer enters a web page through a User Interface (UI) screen enter 601, hover information associated with multi-choice screen elements of an on-screen field in the web page is displayed. For displaying the hover information, the modification platform 115 runs a programmatic script against a reference hover information document 605 when the application developer enters the web page. In an embodiment, the programmatic script may be a JavaScript, or a .NET framework to trigger a Structured Query Language (SQL) query over the database 211 The programmatic script may also be a third Generation programming Language (3GL), for example, C, C++, C#, BASIC, PASCAL, etc.

The modification platform 115 queries a Universal Network Object (UNO) hover information 609 that stores the hover information. In one embodiment, the hover information may include, but is not restricted to, a hover information location code, a hover information location translation, an operation name, a hover information operation translation, a hover information value, and a hover information version. Next, the UNO hover information 609 provides query results and/or hover information values for each of on-screen fields that require the hover information. The results are then displayed on the user interface for the application developer.

Further, a hover information editor (UI) 603 is presented to the application developer in which the application developer may modify and/or update the hover information. In an embodiment, the modification platform 115 enables only authorized users to modify and/or update the hover information. The hover information editor UI 603 get hover information values from the hover information document 605 which are then displayed on the hover information editor UI 603.

Next, when the application developer desires to modify and/or update the hover information values then the application developer may store new entered or modified hover information values in the UNO hover information 609 by using a UNO hover information trigger 611. In one embodiment, the UNO hover information trigger 611 may store data such as, a user ID of person who modified the hover information, old hover information value, new hover information value, date and time of modification, and the like. In an embodiment, the new hover information may be the modified hover information.

In order to authorize the application developer to modify and/or update the hover information, the hover information editor UI 603 may refer to a hover information editor role 607. The hover information editor role 607 stores profiles of the authorized application developers for providing authorization to modify and/or update the hover information stored in the UNO hover information 609. The profiles of the authorized users may include, but are not restricted to, user names, user identifications (IDs), passwords, and the like. The authorized application developer may then modify and/or update the hover information displayed on the hover information editor UI 603. Next, the modified and/or updated hover information values are then stored in the UNO hover information 609.

Figure 7A:
FIGS. 7A-7D are diagrams of a Graphical User Interface (GUI) of an application for modifying the hover information, according to one embodiment.
Figure 7B:
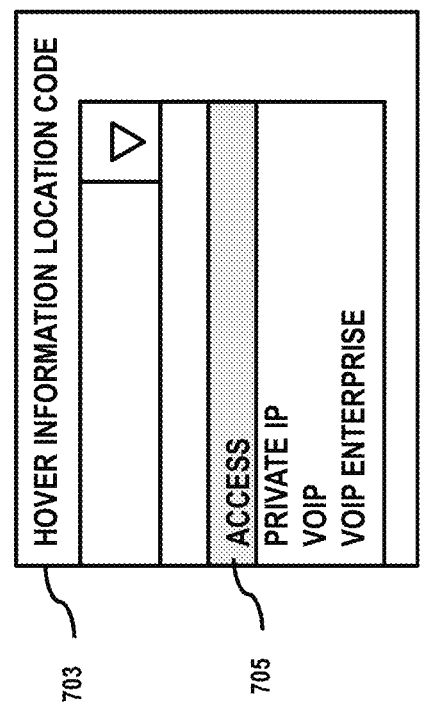
Figure 7C:
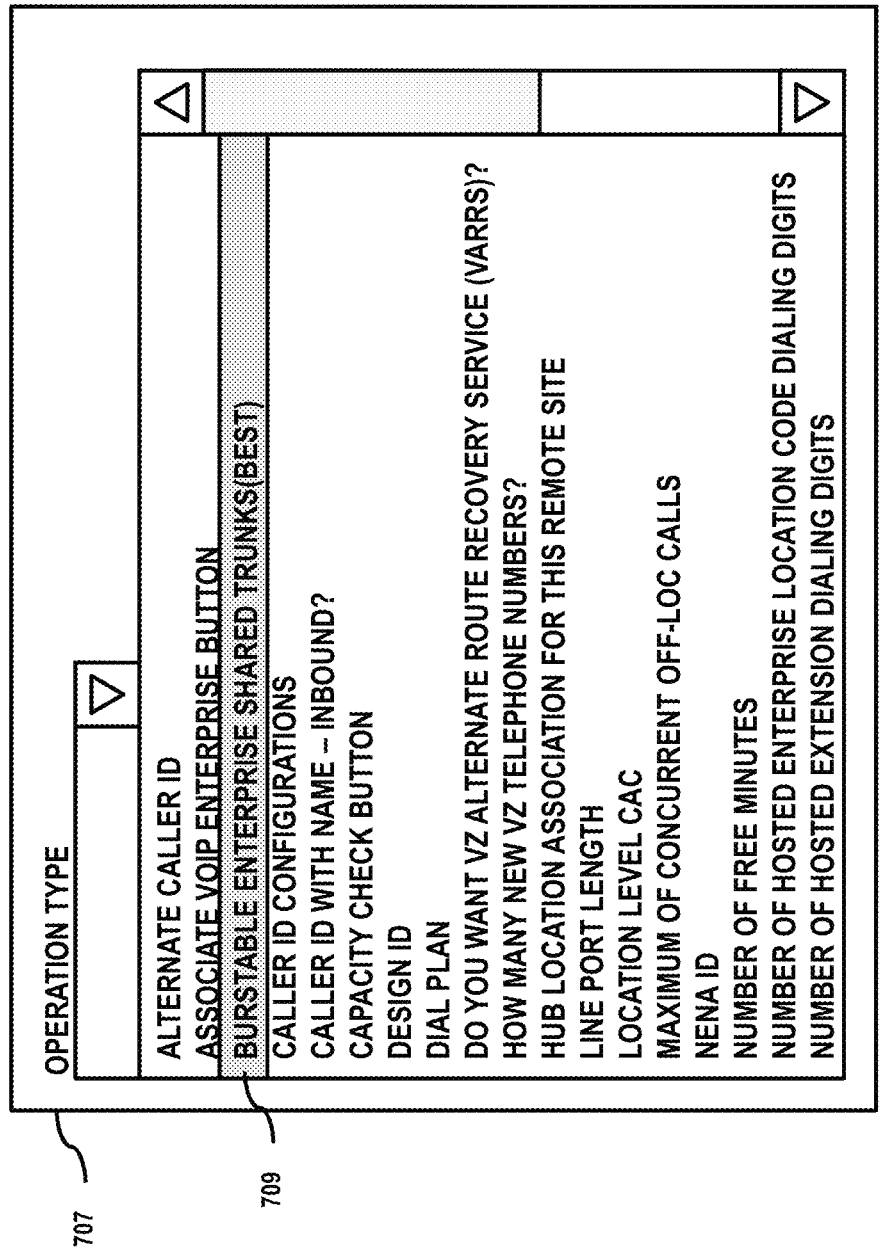

FIGS. 7A-7F are diagrams of a Graphical User Interface (GUI) of an application for modifying the hover information, according to one embodiment. A hover information editor tab 701 is shown in FIG. 7A through which an authorized application developer and/or editor may access and edit hover information stored in the database 211. Various screen elements of a user interface of the application 103 are shown. FIG. 7B displays a GUI through which the editor may select a hover information location code 703 from a drop-down list. The editor may select an area of interest on which modification is required. In one embodiment, a drop-down list of the hover information location code 703 may include, but is not restricted to, an access, a private Internet Protocol (IP), a Voice over Internet Protocol (VoIP) enterprise, and the like. As shown in the FIG. 7B, the editor selects the access 705 from the drop-down list. Further, the editor selects operation type 707 such as, an alternate caller id, an associate VoIP enterprise button, caller ID configurations, a design ID, and the like. The editor may select the operation type 707 from the drop-down list that the editor desires to perform. In an embodiment, the operation type 707 may be a user friendly field name such as, a hover information version. For example, the editor selects a Burstable Enterprise Shared Trunks (BEST) 709 from the drop-down list. When these options are selected, the existing hover information is displayed to the editor.

Figure 7D:
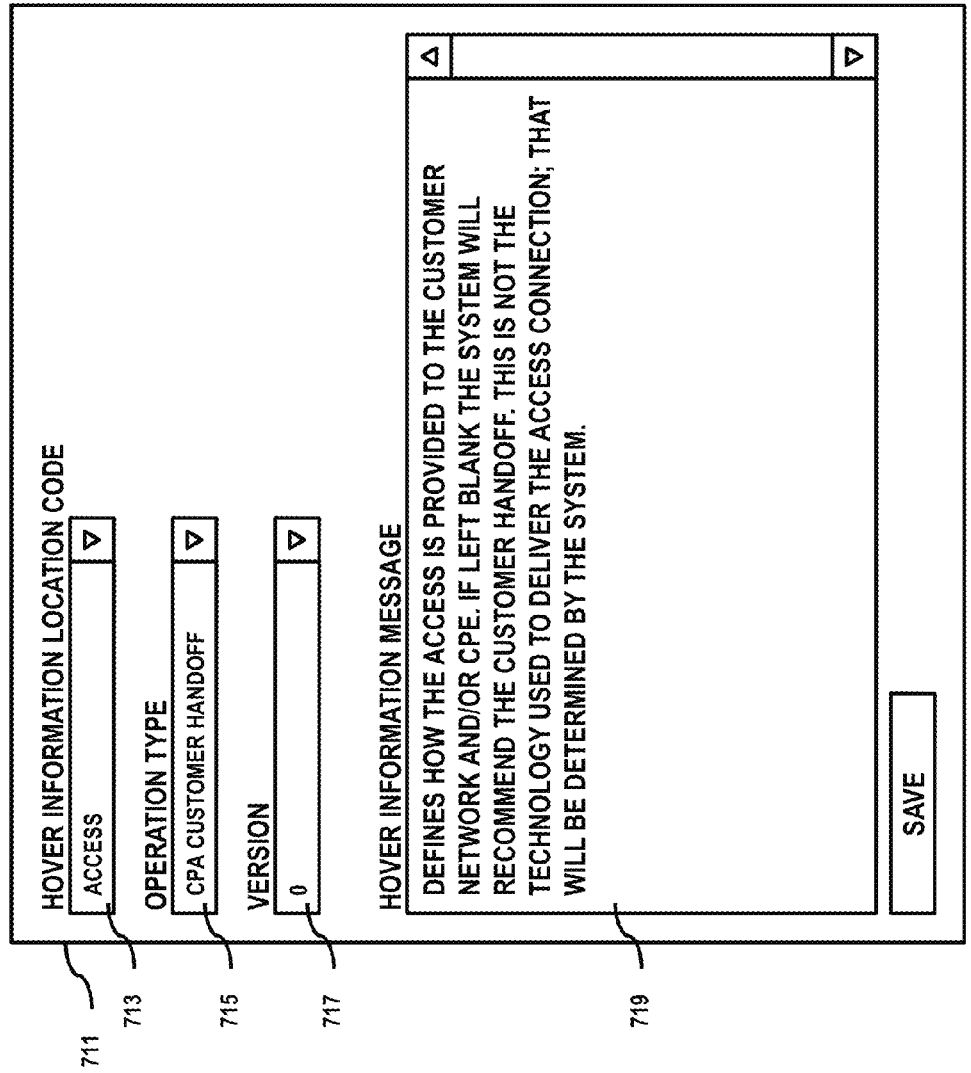

FIG. 7D displays a GUI that provides editing options to the editor to access the hover information of an area of interest by providing inputs. In one embodiment, the inputs may include, but are not restricted to, a hover information location code 711, for example, an access 713, an operation type such as, CPA customer handoff 715, a version such as, version 0 717, and the like. The hover information location code 711 may be used to determine the location where the hover information is located. For example, the hover information location code 711 may refer to a page where the coding of the hover information may be found. The operation type may be used to determine a field on a page where the hover information may be found. In one scenario, this may refer to actual name of the field in the UI as well as a variable name in the reference document. The version is a numeric field that may be used to specify a version of the on-screen field if there are multiple versions for its hover information. For example, if the editor selects a port type as "Ethernet" then the version may display a version 0, or if the editor selects the port type as "TDM" then the version may display a version 1. In one implementation, the application 103 may automatically select the version based on the selection of the operation type by the editor. In another implementation, the editor manually selects the hover information version.

Figure 7E:
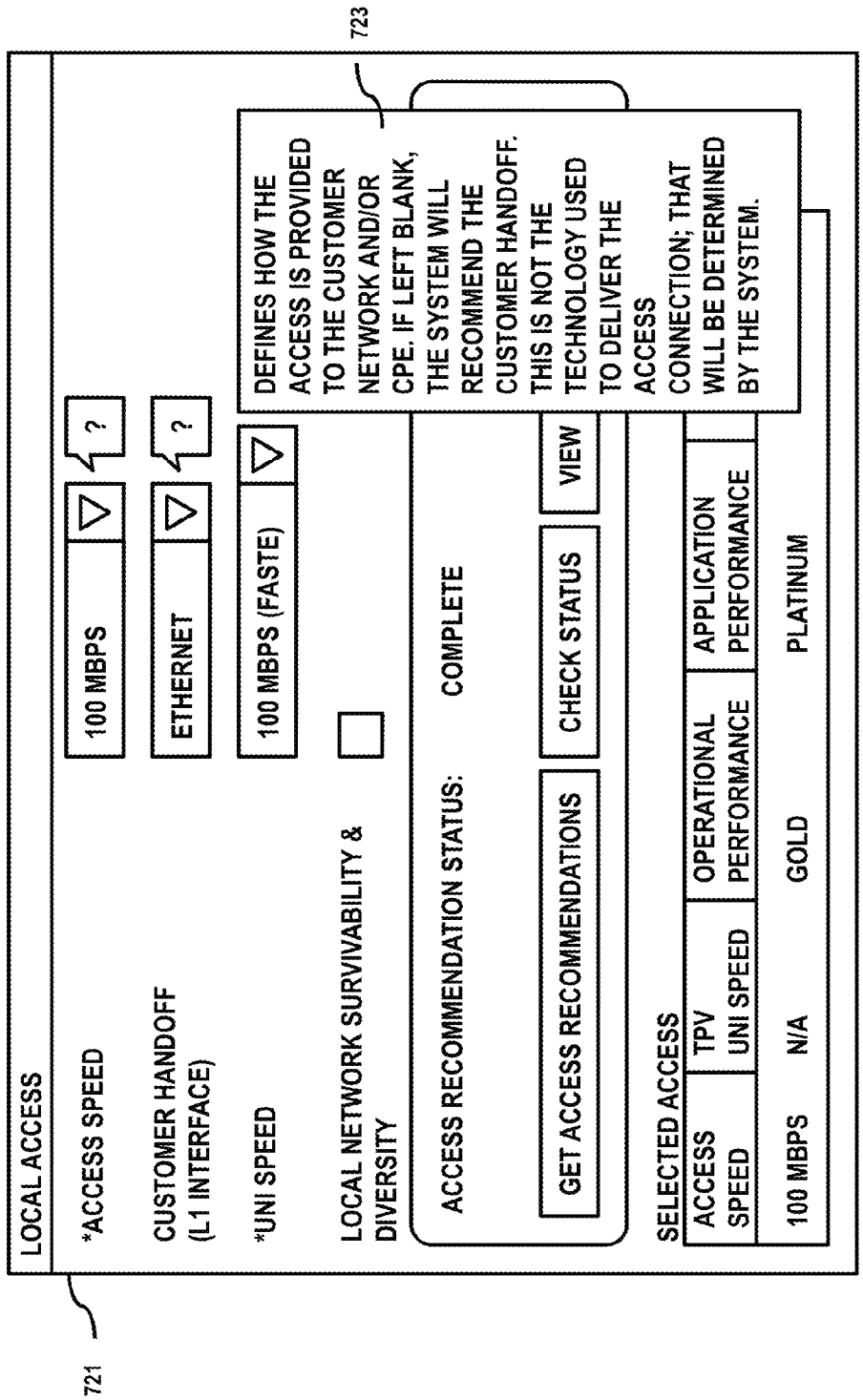
FIG. 7E is a diagram of a document displaying the hover information, according to one embodiment.

Based on these selections, existing hover information 719 associated with the multi-choice screen element of the on-screen field is displayed to the editor. The editor may then modify and/or update the hover information 719 and save the changes. In one embodiment, when the editor modifies the hover information 719 and clicks on save button, new hover information is immediately in effect in the application 103 without any further coding. The source code for the changes made by the developer is automatically generated by the modification platform 115 and updated into the application. FIG. 7E displays a GUI for local access 721 that displays the new hover information 723 with its associated multi-choice screen element. The new hover information may be associated with multi-choice screen elements such as, a UNI speed, a local network survivability and diversity, an access recommendation status, and a selected access.

FIG. 7F is a diagram of architecture of the database 211 that stores the hover text data associated with the multi-choice screen elements, according to one embodiment. The database 211 may store the hover text data associated with a multi-choice screen element in a row. In one scenario, the row is associated with an on-screen field to which the hover text data applies. Each row may include a table 725 that is made up of six primary column name and a data type (variable character length e.g., 16 byte, 64 byte, 1024 byte, etc.) for each of the column is also defined, in one embodiment. The column name may include, but is not restricted to, a hover information location code 711, a hover information location translation, an operation name, a hover information operation translation, a hover information value, a hover information version, a "cwdocid" document, and the like.

The table 725 may include the hover information location code 711 is a code that may be used to determine a location where the hover information is located. For example, the hover information location code 711 may refer to a page where the coding of the hover information may be found. In an embodiment, the data type of the hover information location code 711 is 64 byte. Next, the hover information location translation is an English translation of the hover information location code 711. In an embodiment, the data type of the hover information location translation is 64 byte. Further, the operation name is a code that may be used to determine a field on a page where the hover information may be found. In one scenario, this may refer to an actual name of the on-screen field in the UI as well as a variable name in the reference document. In an embodiment, the data type of the operation name is 64 byte. The hover information operation translation is an English translation of the operation code. Generally, it is equal to a label of the on-screen field. In an embodiment, the data type of the hover information operation translation is 64 byte.

The hover information value may be referred to a hover text data and/or content that is displayed in the GUI for a specified multi-choice element of the on-screen field. In an embodiment, the data type of the hover information value is 1024 byte. Next, the table 725 may include the hover information version that may be a numeric field used to specify a version of the field if there are multiple versions for its hover information. For example, if the editor selects a port type as "Ethernet" then the version may display a version 0, or if the editor selects the port type as "TDM" then the version may display a version 1. In one implementation, the application 103 may automatically select the version based on the selection of the operation type by the editor. In an embodiment, the data type of the hover information version is 64 byte. In another implementation, the editor manually selects the hover information version. Also, the "cwdocid" in the table 725 refers to an ID of the document. In an embodiment, the data type of the "cwdocid" document is 16 byte.

FIG. 8 is a diagram of a Graphical User Interface (GUI) for enabling the hover information on a page, according to one embodiment. An application developer may create a hover information document that may include variables for specific on-screen fields on the page, in one embodiment. The reference document may also include variables for specific hover information associated with the on-screen fields, in another embodiment. The GUI may include a general tab 801, a variables tab 803, a methods tab 805, and a mapping tab 807. The general tab 801 may display information about the document and the editor who logged in to modify and/or update the hover information in the database 211. The information may include, but is not restricted to, an editor name, an editor ID, a password, and the like. Next, the variable tab 803 may display variables associated with specific on-screen fields and the hover information stored in rows of the database 211. In one embodiment, the variables tab 803 may display variables, for example, a hover information location code, an operation name, a hover information value, a hover information version, a document ID, a type of a Provider Instance Port (PIP) service port, a PIP service port speed, a PIP service dynamic bandwidth, and the like. In the variables tab 803, a type 809 of the variables may also be displayed. For example, the hover information location code have a string type of 64 byte that is displayed as "CWT_DICT.STRING64" (STRING, 64) 811. In one implementation, the order of first four variables must be same for the editor to work correctly. Further, in the methods tab 805, the editor may write a query in order to create one or more methods for modifying the hover information stored in the database 211. In the mapping tab 807, the mapped and/or matched hover information with the editor's query is displayed.

Figure 9A:
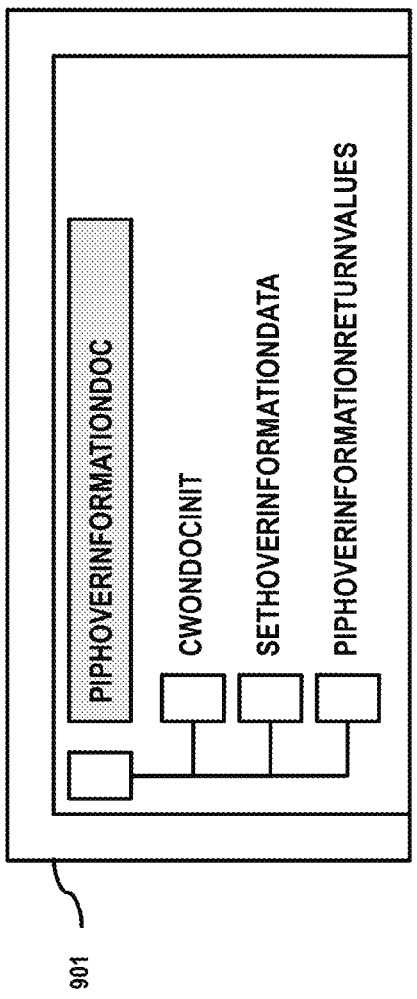
FIG. 9A is a diagram of components of a hover text document, according to one embodiment.
Figure 9B:
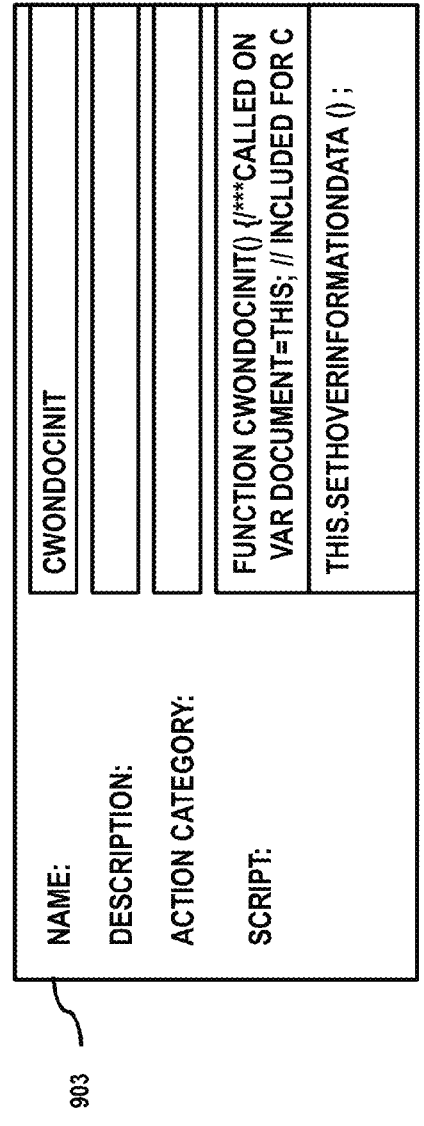
FIG. 9B is a diagram of a Graphical User Interface (GUI) of an application for creating a hover text document, according to one embodiment.

FIG. 9A is a diagram of components of a hover text document, according to one embodiment. When the editor creates the hover information document, its associated three document methods are created, in an implementation. First, an override method "CWONDOCINIT" is created which may automatically run when the document is initialized. In one embodiment, the application 103 captures the editor's input and then creates the override method in the backend. A GUI 903 for creating a hover text document is shown in FIG. 9B that includes, but is not restricted to, a name of the method, a description of the method, an action category that specifies what action is to be perform, and a programmatic script that is to be automatically run when the document is initialized.

Next is a programmatic script method, for example, a JavaScript method and/or a set hover information data method, is created that is used to set initial values of the hover information to the document, in an embodiment. An exemplary JavaScript pseudo code to set values for retrieval of a hover text data row in the database 211 may be:

```
if(!this.parent.accessTooltipDoc){
   return;
}
if(elementName == 'accessOwerVar'){
   if(this.accessInfoDoc.accessOwner == 'Verizon Provided'){
      elementName = 'accessOwerVarV0' ;
   }
   else{
       elementName = 'accessOwerVarV1' ;
   }
}
return this.parent.accessTooltipDoc.accessTooltipReturnValues(elementName);
```

In an embodiment, this programmatic script may use a finder function, which may be a SQL query to retrieve the hover information. An exemplary SQL command may be:

```
select tooltip_location_code, operation_name, tooltip_value,
tooltip_version from uno_tooltip
where tooltip_location_code = 'PR_ACC'
```

FIG. 10 shows a JavaScript pseudo code 1001 to set the initial values of the hover information to the document. Further, the JavaScript method and/or hover information return values method may be created to retrieve the hover information values. FIG. 11 shows a JavaScript pseudo code 1101 to retrieve the hover information values from the database 211. In an embodiment, the hover information return values method may take input string values called as 'elementName'. The 'elementName' may be the name of a calling on-screen field that is used to determine a text value to be displayed on a screen to the editor.

Figure 12:
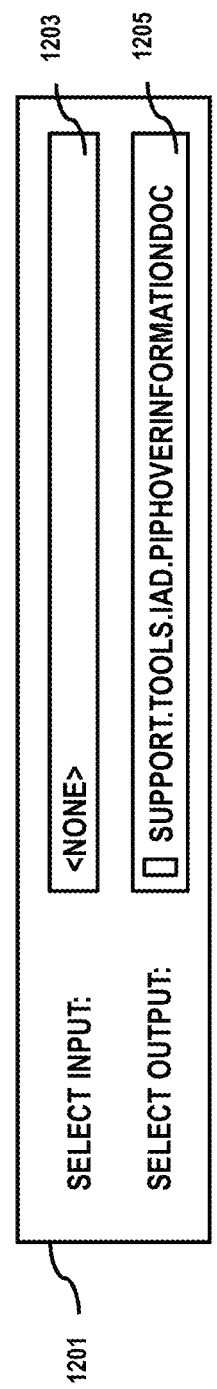
FIG. 12 is a diagram of a Graphical User Interface (GUI) of an application for defining a finder function to retrieve the hover information, according to one embodiment.

Thereafter, a finder function may be defined. The finder function may retrieve the hover information from the database 211 based on the inputs and/or queries provided by the editor. FIG. 12 is a diagram of a GUI 1201 through which the editor may select an input field 1203 and an output field 1205 of the finder function. In one embodiment, the editor may have to set the created document (as discussed above) as the output field 1205 of the finder function.

In an exemplary embodiment, the JavaScript pseudo code may be applied at a parent level and a child level.

The pseudo code may be applied at the parent level by performing following steps. First, in a highest parent user interface of a namespace, for example, 'pipServiceDetailUI', a single variable such as a 'piphovertextdataDoc' may be created. The variable may be of a type "document" that points to a document stored in 'support.tools.iad'.

Next, to populate a page with the hover text data a programming code may be used. Exemplary pseudo code may be:

```
if(this.piphovertextdataDoc == null){
   this.piphovertextdataDoc = new svc.pip.piphovertextdataDoc(null,this);
}
```

The above mentioned pseudo code initiates the hover text data document for use within this location.

Further, the programming code may be applied at the child level by performing following steps. First, a 'getDynamichovertextdataValues' method may be created at the child level where a hover text data field actually exists. In an embodiment, the field may be 'pipServicePriceImpact' and a pseudo code to retrieve the dynamic hover text data values may be:

```
if(elementName == 'pip_service_port_type'){
   if{this.pipServiceGeneralInfoDoc.pip_service_port_type == 'Ethernet' ||
       elementName = 'pip_service_port_typeV0';
   }
   else{
       elementName = 'pip_service_port_typeV1';
   }
}
return this.parent.parent.piphovertextdataDoc.piphovertextdatareturnvalues(elementName);
```

In this method, since the port type uses a dynamic method to select version of the text to display, the 'elementName' may be changed and append to versions V0, V1, or Vn depending on appropriate conditions to the actual on-screen field name. In an embodiment, this method may have a string type field named 'elementName' that may be passed to the 'hovertextdatareturnvalues' method. Also, an application developer has to pay attention that where he is at a moment in a UI. For example, the UI (e.g., 'pipServiceDetailsUI') housing the variable may be in a Grandparent level ('this.parent.parent.piphovertextdataDoc'). Depending on the current position, the Grandparent level may change.

In an exemplary embodiment, let say, 'pipServiceDiversityDataEntryUI' may be a child of 'pipServicePriceImpactUI' that creates it in a form frame. As the 'pipServiceDiversityDataEntryUI' may be used under the frame of 'pipServicePriceImpactUI', then the 'pipServiceDetailsUI' becomes Grandparent of the 'pipServiceDiversityDataEntryUI'. Therefore, the 'getDynamichovertextValues' method may be created for the 'pipServiceDiversityDataEntryUI' by using a pseudo code

```
return
this.parent.parent.parent.piphovertextdataDoc.piphovertextdatareturnvalues(elementName);
```

In the above example, the additional parent call makes it 'this.parent.parent.parent.piphovertextdataDoc'.

Further, for the 'getDynamichovertextdataValues' method, the return type must be set to string. In case, if the return type is not set to the string, then the selection of the dynamic method may not be available.

A final step may be to add this method to the required on-screen field and an "independent" checkbox after selecting the dynamic method must be selected. This may pass the field name (i.e., 'pip_service_port_type') to the 'getDynamichovertextdataValues' method through the 'elementName' variable input. This name must be equal to an operation type and a variable name in the document.

By following the above discussed steps, the UI start displaying the hover text data when the application developer enters an indicated page.

Figure 13:
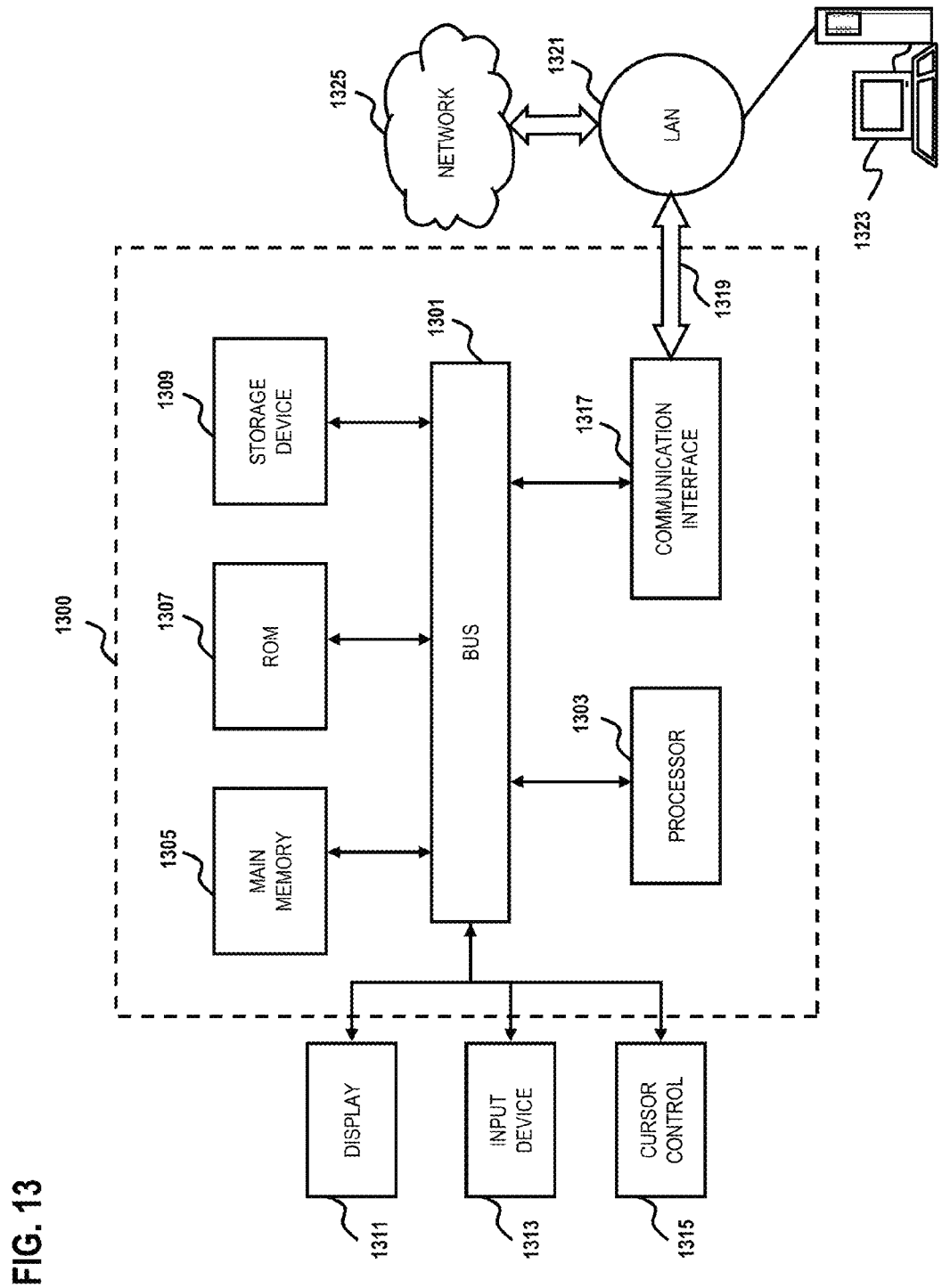
FIG. 13 is a diagram of a computer system that can be used to implement various exemplary embodiments.

FIG. 13 illustrates a computing hardware (e.g., mobile system) 1300 on which exemplary embodiments may be implemented. The mobile system 1300 includes a bus 1301 or other communication mechanism for communicating information and a processor 1303 coupled to the bus 1301 for processing the information. The mobile system 1300 also includes a main memory 1305, such as a Random Access Memory (RAM) or other dynamic storage device, coupled to the bus 1301 for storing the information and instructions to be executed by the processor 1303. The main memory 1305 may also be used for storing temporary variables or other intermediate information during execution of instructions by the processor 1303. The mobile system 1300 may further include a Read Only Memory (ROM) 1307 or other static storage device coupled to the bus 1301 for storing static information and instructions for the processor 1303. A storage device 1309, such as a magnetic disk or an optical disk, is coupled to the bus 1301 for persistently storing information and instructions.

The mobile system 1300 may be coupled via the bus 1301 to a display 1311, such as a Cathode Ray Tube (CRT), a liquid crystal display, an active matrix display, or a plasma display, for displaying information to the mobile user. An input device 1313, such as a keyboard including alphanumeric and other keys, is coupled to the bus 1301 for communicating information and command selections to the processor 1303. Another type of a user input device may be a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the mobile system 1300, in response to the processor 1303 executing an arrangement of instructions contained in the main memory 1305. Such instructions may be read into the main memory 1305 from another computer-readable medium, such as the storage device 1309. Execution of the arrangement of instructions contained in the main memory 1305 causes the processor 1303 to perform the process steps described herein. One or more processors in a multi-processing arrangement may also be employed to execute the instructions contained in the main memory 1305. In alternative embodiments, hard-wired circuitry may be used in place of or in combination with software instructions to implement exemplary embodiments. Thus, exemplary embodiments are not limited to any specific combination of hardware circuitry and software.

The mobile system 1300 may also include a communication interface 1317 coupled to the bus 1301. The communication interface 1317 provides a two-way data communication coupling to a network link 1319 connected to a Local Area Network (LAN) 1321. For example, the communication interface 1317 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 1317 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, the communication interface 1317 sends and receives electrical, electromagnetic, or optical signals that carry digital data streams representing various types of information. Further, the communication interface 1317 may include peripheral interface devices, such as a Universal Serial Bus (USB) interface, a Personal Computer Memory Card International Association (PCMCIA) interface, etc. Although a single communication interface 1317 is depicted in FIG. 9, multiple communication interfaces may also be employed.

The network link 1319 typically provides data communication through networks to other data devices. For example, the network link 1319 may provide a connection through the LAN 1321 to a host computer 1323, which has connectivity to a network 1325 (e.g., a Wide Area Network (WAN) or the global packet data communication network now commonly referred to as the "Internet") or to data equipment operated by a service provider. The LAN 1321 and the network 1325 both use electrical, electromagnetic, or optical signals to convey information and instructions. The signals through the various networks and the signals on the network link 1319 and through the communication interface 1317, which communicate digital data with the mobile system 1300, are exemplary forms of carrier waves bearing the information and instructions.

The mobile system 1300 may send messages and receive data, including program code, through the network(s), the network link 1319, and the communication interface 1317.

In the Internet example, a server (not shown) might transmit requested code belonging to an application program for implementing an exemplary embodiment through the network 1325, the LAN 1321 and the communication interface 1317. The processor 1303 may execute the transmitted code while being received and/or store the code in the storage device 1309, or other non-volatile storage for later execution. In this manner, the mobile system 1300 may obtain application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media may include, for example, optical or magnetic disks, such as the storage device 1309. Volatile media may include a dynamic memory, such as the main memory 1305. Transmission media may include coaxial cables, copper wire and fiber optics, including the wires that include the bus 1301. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 14:
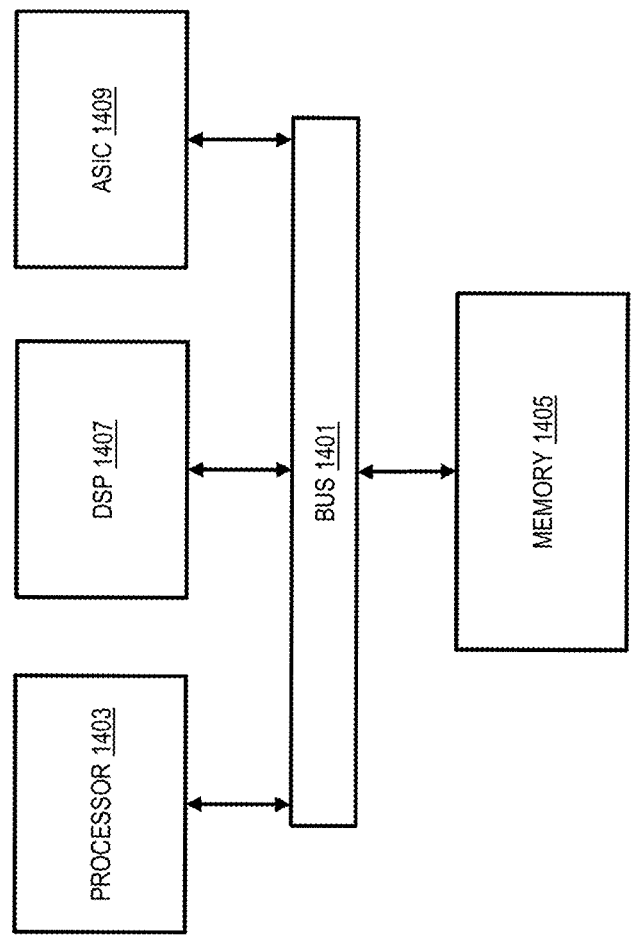
FIG. 14 is a diagram of a chip set upon which an embodiment of the invention may be implemented, according to one embodiment.

FIG. 14 illustrates a chip set 1400 upon which an embodiment of the invention may be implemented. The chip set 1400 is programmed to present a slideshow as described herein and includes, for instance, the processor and memory components described with respect to FIG. 13 incorporated in physical packages (e.g., chips). By way of example, a physical package may include an arrangement of materials, components, and/or wires on a structural assembly (e.g., a baseboard) to provide characteristics such as physical strength, conservation of size, and/or limitation of electrical interaction. It is contemplated that in certain embodiments the chip set 1400 can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include processing cores with each core to perform independently. A multi-core processor enables multiprocessing within a single physical package. Examples of a multi-core processor may include two, four, eight, or greater numbers of processing cores. Alternatively or in addition, the processor 1403 may include microprocessors configured in tandem via the bus 1401 to enable independent execution of instructions, pipelining, and multithreading. The processor 1403 may also be accompanied with specialized components to perform certain processing functions and tasks such as Digital Signal Processors (DSP) 1407, or Application-Specific Integrated Circuits (ASIC) 1409. The DSP 1407 typically processes real-world signals (e.g., sound) in real-time independently of the processor 1403. Similarly, the ASIC 1409 may perform specialized functions not easily performed by a general purposed processor. Other specialized components to aid in performing the inventive functions described herein include Field Programmable Gate Arrays (FPGA) (not shown), controllers (not shown), or other special-purpose computer chips.

The processor 1403 and accompanying components have connectivity to the memory 1405 via the bus 1401. The memory 1405 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 1405 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for dynamically modifying hover information associated with on-screen field of an application, the method is performed by a processor, comprising:
   receiving a user interface interaction event, by an application executing at a user device, the user interface interaction event being generated in response to user interaction with an on-screen field associated with the application;
   retrieving, based on the user interface interaction event, and from a database that is connected to the user device via a network, hover information describing the on-screen field, the retrieving including
      using a programmatic script to query the database for the hover information;
   presenting the hover information in association with the on-screen field, wherein the hover information is stored, by the database, according to a schema, the schema including:
      a location code that indicates a location to which the hover information applies, a hover text value that indicates text associated with the hover information, and a version code that indicates a version of the on-screen field;

wherein presenting the hover information additionally includes presenting a user interface for editing the hover information in the database for the on-screen field according to the schema, the presenting of the user interface including identifying a multi-choice screen element associated with the on-screen field, and presenting editing options for the hover information with respect to one or more choices of the multi-choice screen element.

2. The method of claim 1, further comprising:

initiating an execution of the programmatic script against a reference document, wherein the reference document specifies a rendering of a page including the on-screen field.

3. The method of claim 2, further comprising:

pre-populating the page with the hover information queried from the database based on the execution of the programmatic script; and matching the hover information with the on-screen field for the rendering of the page.

4. The method of claim 1, wherein the multi-choice screen element includes a radio button, a hyperlink, a drop-down list, a list box, a combination box, a check box, a cycle button, a datagrid, a slider, or a combination thereof.

5. The method of claim 1, wherein the user device includes user equipment and the user device is connected to the database via a wireless cellular network.

6. An apparatus comprising a processor for dynamically modifying hover information associated with on-screen field of an application, the processor is executed to:

receive a user interface interaction event, by an application executing at a user device, the user interface interaction event being generated in response to user interaction with an on-screen field associated with the application;

retrieve, based on the user interface interaction event, and from a database that is connected to the user device via a network, hover information describing the on-screen field, the retrieving including using a programmatic script to query the database for the hover information;

present the hover information in association with the on-screen field, wherein the hover information is stored, by the database, according to a schema, the schema including:

a location code that indicates a location to which the hover information applies, a hover text value that indicates text associated with the hover information, and a version code that indicates a version of the on-screen field;

wherein presenting the hover information additionally includes presenting a user interface for editing the hover information in the database for the on-screen field according to the schema, wherein presenting the user interface for editing the hover information includes identifying a multi-choice screen element associated with the on-screen field, and presenting editing options for the hover information with respect to one or more choices of the multi-choice screen element.

7. The apparatus of claim 6, wherein the processor is further executed to:

initiate an execution of the programmatic script against a reference document, wherein the reference document specifies a rendering of a page including the on-screen field.

8. The apparatus of claim 7, wherein the processor is further executed to:

pre-populate the page with the hover information queried from the database based on the execution of the programmatic script; and match the hover information with the on-screen field for the rendering of the page.

9. The apparatus of claim 8, wherein the multi-choice screen element includes a radio button, a hyperlink, a drop-down list, a list box, a combination box, a check box, a cycle button, a datagrid, a slider, or a combination thereof.

10. The apparatus of claim 6, wherein the user device includes user equipment and the user device is connected to the database via a wireless cellular network.

* * * * *